Feb. 13, 1951     B. C. NEUSTRAND     2,541,174
INDICATING METER DIAL PLATE ADJUSTABLE MOUNTING
Filed Sept. 4, 1947
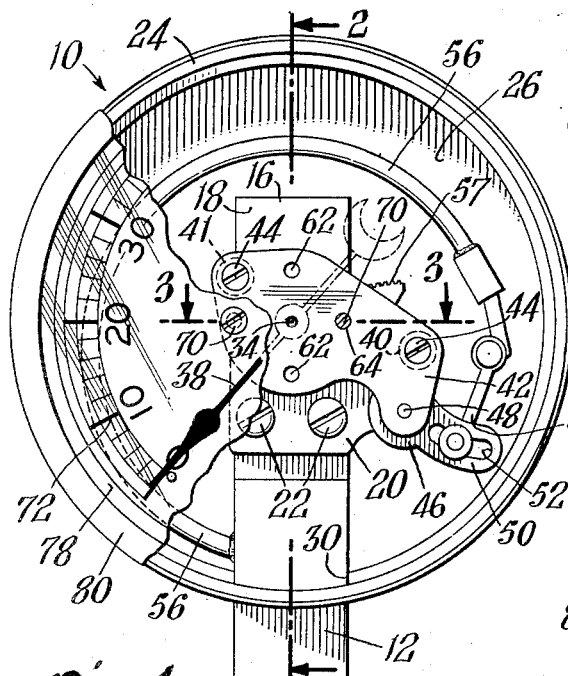
Fig. 1.
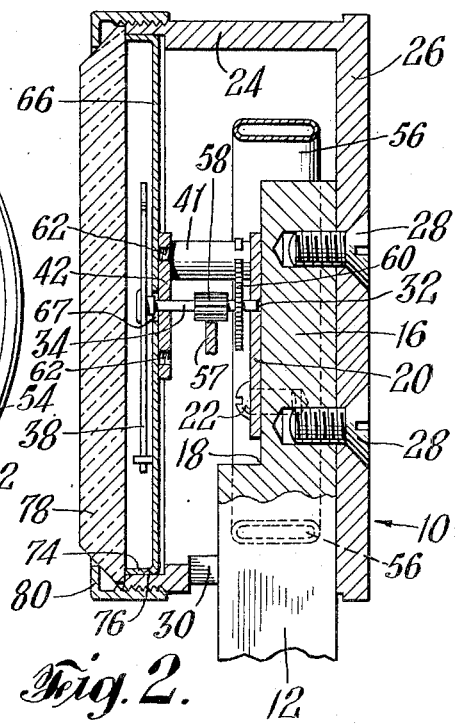
Fig. 2.
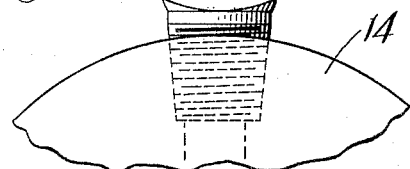
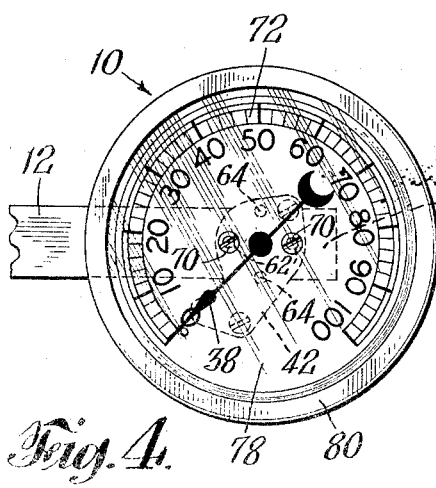
Fig. 4.
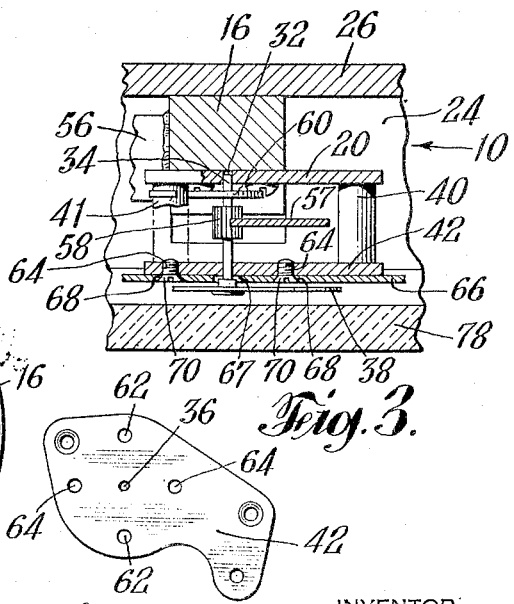
Fig. 3.
Fig. 5.
INVENTOR
BRYNOLD C. NEUSTRAND
BY
E. Greenewald
ATTORNEY Patented Feb. 13, 1951

2,541,174

UNITED STATES PATENT OFFICE 2,541,174

INDICATING METER DIAL PLATE ADJUSTABLE MOUNTING

Brynold C. Neustrand, Cranford, N. J., assignor to The Linde Air Products Company, a corporation of Ohio Application September 4, 1947, Serial No. 772,196

2 Claims. (Cl. 116—129)

This invention relates to indicating meters and more particularly to Bourdon type fluid pressure gauges.

When mounted on oxygen or acetylene gas pressure regulators, for example, such gauges, unless specially manufactured, are subject to positioning which renders them hard to read, because the nipple of one gauge is generally mounted at a right angle with respect to the other gauge on each regulator, and this requires the scales of the two gauges to be located at different angles with respect to their respective nipples. Also the lateral gauges of acetylene regulators are generally located on the left hand side thereof, while the corresponding gauges of oxygen regulators are generally located on the right hand side of the regulator.

In the past separate gauges have been manufactured for each "clock" position, and no means has been provided for adjusting the dial plate with respect to the "clock" position of the nipple, when such position happened to be different from that for which the gauge was made, for most convenient reading of the meter.

The main object of this invention is to provide an indicating meter having a dial plate which can be readily adjusted to any selected one of a plurality of angular positions about the axis of movement of the pointer. Another object is to reduce the cost of manufacture and provide a Bourdon type fluid pressure gauge of improved construction. A further object is to provide an improved mounting for the dial plate of Bourdon gauges that is simple and economical in its parts, easy to make, assemble and calibrate, and which is effective and efficient in use. Other objects will be apparent to those skilled in the art from the following disclosure.

According to the invention there is provided a Bourdon type gauge, for example, comprising a dial and a nipple adapted to be mounted in any desired "clock" position with respect to such dial, the gauge movement being mounted on the nipple and including a dial pointer movable about the center of the dial. A dial plate is conveniently mounted for rotary adjustment with respect to such center, so that the dial can be readily adjusted for most convenient reading depending upon the "clock" position of the nipple.

Referring to the drawings:

Fig. 1 is a view in elevation of an indicating meter illustrating the invention, showing the nipple in the "6 o'clock" position;

Fig. 2 is a vertical sectional view taken on line 2—2 of Fig. 1;

Fig. 3 is a fragmentary horizontal sectional view taken on line 3—3 of Fig. 1;

Fig. 4 is a reduced scale view in front elevation of the meter mounted in a "9 o'clock" position at a right angle to that shown in Fig. 1, with the dial plate adjusted to provide the most convenient reading; and Fig. 5 is a front elevational view of the novel top plate of the movement assembly.

As shown in the drawing, a fluid pressure gauge 10 is provided which comprises a nipple 12 adapted to be mounted on a gas pressure regulator 14, for example, in a conventional manner. The nipple 12 is provided with a shank 16 having a recess 18 in the face of which is mounted a flat bracket 20 by screws 22. A cylindrical protective case 24 having a back 26 is removably secured to the opposite side of the shank 16 by screws 28, the case being provided with a wall opening 30 for accommodating the nipple 12.

The bracket 20 is provided with a bearing 32 for the rear end of a shaft 34, the front end of which carries an indicating pointer 38. The pointer 38 is mounted on the shaft 34 so that the pointer can be rotatably adjusted to any desired initial position with respect thereto, a friction fit being preferred.

The bracket 20 is also provided with two posts 40 and 41 on which is mounted a top plate 42 by screws 44. The top plate 42 is spaced from and positioned parallel to the bracket 20 to provide room for the movement of the gauge which movement includes a crank 46 mounted in suitable bearings 48 on the bracket 20 and top plate 42. The crank 46 has a calibration arm 50 provided, in the illustrated example, with an arcuate slot 52 in which one end of a link 54 is adjustably connected for calibrating purposes. The other end of the link 54 is pivotally connected to the free end of a Bourdon tube 56, the fixed end of which is anchored to one side of the shank 16, the interior of the tube being in communication with the inside of the nipple 12.

The crank 46 also has an arm consisting of a spur gear 57 which meshes with a pinion gear 58, mounted on the shaft 34. A coiled hair spring 60 is connected at one end to the shaft 34 and at the other to post 41 to urge the return of the pointer to its initial position. The operation of a fluid pressure gauge of the Bourdon type is well known to those skilled in the art, and since the gauge 10 operates in the usual way, a description thereof is not deemed necessary here.

The top plate 42 of the movement is provided with four dial mounting screw holes 62 and 64, arranged in pairs, two vertical and two horizontal, forming, in effect, a square on the plate 42. The holes 62 and 64 are located on a circle the center of which coincides with the center of the shaft bearing 36 and the diameter of which circle, in the present example, is of the order of 1¼ inch. A dial plate 66 is mounted for rotary adjustment on the top plate 42. The dial plate is provided with a hole 67 for passage of the shaft 34.

To mount the dial plate 66 on the top plate 42, only one pair of screw holes 68, coinciding with the above mentioned 1⅛ in. top plate circle diameter, are pierced in the dial plate at right angles to the longitudinal axis of the nipple 12 when the dial plate 66 is secured for best reading with the nipple in a "six o'clock" position on the top plate 42 by a pair of screws 70. Locating the screw holes 68 in this fashion permits the dial plate 66 to be selectively positioned on the top plate 42 at "3, 6, 9, or 12 o'clock" positions of the nipple by simply turning it about the shaft 34, and then screwing the screws 70 into the matching holes.

The prior conventional dial mounting arrangement using two mounting posts on the nipple shank, necessitated drilling two dial plate holes in line with such mounting posts and the nipple, or at right angles to posts and nipple. This automatically limited the location of the dial plate. This is in marked contrast to the degree of flexibility achieved with the present new mounting wherein four possible positions exist; and more can be provided by merely supplying any desired number of pairs of screw holes in the top plate 42. With this arrangement only two dial mounting screw holes through the dial plate are necessary and are, in all cases, in the same and most desirable position relative to art work appearing on the dial plate.

A further advantage accruing from the present new type of dial plate mounting is that, clustering the dial plate mounting screws around and substantially close to the dial plate shaft aperture 67 in this fashion provides the greatest possible space between them and the gauge calibrations or scale 72 on the dial plate 66 for identification labels, art work and the like. Moreover, the present screw hole arrangement provides a clear view of the calibration and numbering on the dial plate.

The dial plate 66 has an annular flange 74 which fits in a recess 76 provided therefor in the case 24, and the latter is closed by a transparent cover 78 which is held in place on the front of the protective case 24 by a removable flanged ring 80 which screws on the case 24.

Thus, the cover 78 may be easily removed for the purpose of providing access to the dial plate 66 when it is desired to change the position of such plate. At the same time the pointer 38 may be adjusted to an initial position corresponding to the new dial plate setting.

It will be understood, as pointed out above, that as many positions as may be desired may be provided for the dial plate by merely increasing the number of pairs of dial plate mounting screw holes in the top plate 42. Alternatively any suitable means may be provided between the dial plate and top plate, for adjustably securing the dial plate in any selected rotary position with respect to the axis of movement of the pointer shaft, without departing from the invention.

Other features of the present invention which are believed to be novel include: (1) increasing the thickness of the movement holding portion of the shank 16 from $\frac{3}{32}$ in. to $\frac{25}{64}$ in. to reduce the milling operation performed thereon and also giving a stronger backing for the gauge movement; (2) repositioning the Bourdon tube 56 toward the front of the shank 16 by the difference between $\frac{25}{64}$ in. and $\frac{7}{32}$ in. to maintain linkage alignment and reduce the possibility of interference of the tube 56 and protective case 24 by giving greater clearance between the back 26 of the protective case 24 and the Bourdon tube 56; and (3) eliminating all dial plate mounting posts and assembly of such posts to the shank 16.

I claim:

1. In an indicating meter the combintion of a disk-shaped dial plate having a central aperture, a shaft extending through said aperture, a pointer secured to said shaft for movement thereby over the face of said dial plate, a meter-movement top plate providing a combined backing support for said dial plate and bearing for said shaft, said top plate having at least two pairs of screw-threaded holes equally spaced radially from said bearing, said dial plate having only one pair of holes suitably spaced from said aperture for selective alignment with either pair of said two screw-threaded holes, and a pair of screws cooperating with the aligned holes and clamping said dial plate immovably in place on said top plate in the desired position, the pointer being secured to said shaft for adjustment with respect to the shaft about such axis so that the initial position of the pointer can be set to correspond to the selected position of said dial plate.

2. A Bourdon type fluid pressure gauge comprising, in combination, a nipple provided with a shank having a lateral recess, a movement assembly mounted on said shank in the face of said recess and comprising a top plate having a shaft bearing hole, an indicating pointer shaft supported by said plate in such bearing hole, an indicating pointer secured to the front end of said shaft for rotary adjustment with respect thereto, and a disk-shaped dial plate mounted directly on and completely masking said top plate, said dial plate having a central hole through which said shaft extends and also having a graduated fluid pressure scale disposed back of said pointer, a cylindrical case having a back secured to said shank opposite the face of said recess, said case also having a wall opening through which said nipple extends, and a transparent cover removably mounted on said case in front of said dial plate, said top plate having a series of screw threaded holes arranged in a circle about the center of said shaft bearing hole, such screw threaded holes being disposed in at least two diametrically opposite pairs, and said dial plate having a single pair only of diametrically opposite screw holes adapted to coincide with a selected pair of said screw threaded holes in said top plate when the dial plate is turned about said shaft to a desired position, and a pair of screws engaging said screw threaded holes in the plate and extending through said screw holes in the dial plate, securing said dial plate against movement relatively thereto in the desired position on said top plate.

BRYNOLD C. NEUSTRAND.

REFERENCES CITED

The following references are of record in the file of this patent:

UNITED STATES PATENTS

| Number | Name | Date |
|---|---|---|
| Re. 19,709 | Peace | Sept. 17, 1935 |
| 1,610,304 | Mabie | Dec. 14, 1926 |
| 2,237,653 | Chatillon | Apr. 8, 1941 |